Patented Dec. 1, 1942

2,303,683

UNITED STATES PATENT OFFICE 2,303,683

INSECTICIDAL COMPOSITION

Gerald H. Coleman and Fred W. Fletcher, Midland, Mich., assignors to The Dow Chemical Company, Midland, Mich., a corporation of Michigan No Drawing. Application January 15, 1941, Serial No. 374,556

9 Claims. (Cl. 167—24)

This invention relates to insecticidal compositions and is particularly concerned with spray and dust materials adapted for combating flies, mosquitoes, and common agricultural insect pests.

Extracts of such insecticidal plant products as pyrethrum flowers, derris, cube, timbo, barbasco, and the like are widely used for the control of insect pests. These toxicants are generally employed as constituents of dusting mixtures, petroleum distillate sprays, or in aqueous dispersion. Pyrethrin-containing compositions have a quick paralyzing action on flies and other insects but give a relatively low kill as compared to the per cent knockdown. With rotenone a high moribund kill is generally obtained, although a considerable period of time is required to destroy insect pests. The plant extracts are generally unstable to heat and light and lose their effectiveness to a considerable degree upon storage.

We have discovered that mixtures of one or more of these plant extract toxicants with certain ether compounds have a greatly increased effectiveness against insect pests. The group of phenolic ethers employed in such toxicant mixtures according to the present invention are those having the following formula

$$R\text{—}O\text{—}C_nH_{2n}\text{—}X$$

wherein R represents an aromatic radical, X is chlorine or bromine, and $n$ is an integer greater than 1. A preferred group of compounds falling within the scope of the foregoing formula are those in which $n$ is an integer from 2 to 4, inclusive.

Dust and spray compositions comprising as an effective toxicant such a mixture of pyrethrins and/or rotenone with one or more of the foregoing synthetic ether compounds are more stable to heat and light and have a greater paralyzing effect and a greater lethal effect on insects than do compositions comprising an equivalent amount of the plant extract toxicants alone. By employing such combinations of parasiticidal materials, significant economies in the amounts of pyrethrin and/or rotenone required are effected. In such compositions the synthetic ether compounds and the rotenone or pyrethrin so supplement one another as to result in a greater than additive control of insect pests. That is to say, a synergistic effect is obtained.

The exact amounts of pyrethrins and/or rotenone employed and the proportion of synthetic ether compound mixed therewith varies with the particular materials concerned, the type of composition in which such toxicant mixture is to be employed, and the nature of the insect or mite pest to be controlled. Generally speaking, a concentration of from about 0.5 to 5 grams of the ether compound per 100 grams of the finished insecticidal composition is sufficient. The amounts of rotenone or pyrethrins employed may be those common to spraying and dusting practices, although appreciably smaller amounts are operable where a result comparable to that obtained with the plant extract toxicant alone is desired.

The aromaticoxy-alkyl halides with which the present invention is concerned are conveniently prepared by reacting phenols with dihalogen-substituted paraffin hydrocarbons in the presence of aqueous sodium hydroxide. In carrying out such reaction, an excess of the dihalo-paraffin hydrocarbon is reacted with substantially equimolecular proportions of the caustic and phenol. The reactants are mixed together with heating and stirring to a reaction temperature generally between about 80° and 150° C., depending upon the reactivity of the dihalo paraffin hydrocarbon employed. When the reaction is complete, the mixture is cooled, extracted with a suitable water-immiscible organic solvent, and the extract fractionally distilled, whereby the aromaticoxy-alkyl halide is obtained in good yield. Both the mono- and di-substituted derivatives of the dihalo paraffin hydrocarbon are generally produced in the reaction, the excess of the halogenated hydrocarbon favoring the formation of the mono-substituted product. The compounds so obtained are low-melting solids or relatively high-boiling water-insoluble liquids, and are substantially non-irritating to higher animals at the concentrations employed according to the present invention.

The following examples are purely illustrative and are not to be construed as limiting the invention:

EXAMPLE 1

A standard pyrethrin extract was dissolved in a petroleum distillate having a boiling range of 345°–508° F. and a flash point of 137° F. in amount sufficient that each 100 milliliters of the ultimate solution contained 50 milligrams of pyrethrins. Portions of the base solutions were modified with a number of aromaticoxy-alkyl halides. Each such synthetic ether compound was employed at the rate of 2.5 grams per 100 cc. of base solution. The several compositions so obtained were tested according to the Peet-Grady method (Soap 8, No. 4, 1932, pages 98-102 and 121) to determine their efficiency against three-day old houseflies. To provide basis for the comparison of the efficiency of such mixtures with the efficiencies of the several individual toxicants employed therein, control determinations were made with the base solution alone and with solutions of the several aromaticoxy-alkyl halides at 2.5 grams per 100 cc. in the petroleum distillate. The following table sets forth the results obtained with representative mixtures:

phenoxy)-ethyl chloride, beta-(2.4-dichloro-phenoxy)-ethyl chloride, beta-(4-tertiarybutyl-phenoxy)-ethyl chloride, beta-(2,6-dichloro-4-tertiarybutyl-phenoxy)-ethyl chloride, beta-(2-xenoxy)-ethyl chloride, beta-(4-chloro-phenoxy)-ethyl bromide, gamma-(2,4,6-trichloro-phenoxy)-propyl chloride, gamma-(4-chloro-phenoxy)-isobutyl chloride, gamma-(4-bromo-phenoxy)-isobutyl chloride, gamma-(2-methoxy-phenoxy)-isobutyl chloride, gamma-(beta-naph-thoxy)-isobutyl chloride, beta-(4-xenoxy)-iso-butyl chloride, delta-(2-cyclohexyl-phenoxy)-n-

Table

| Name of compound | 2.5 grams of ether compound per 100 cc. petroleum distillate | | 50 mgs. pyrethrins per 100 cc. petroleum distillate | | 2.5 grams of ether compound plus 50 mgs. pyrethrin per 111 cc. petroleum distillate | |
|---|---|---|---|---|---|---|
| | Knockdown 10 minutes | Kill in 48 hours | Knockdown 10 minutes | Kill in 48 hours | Knockdown 10 minutes | Kill in 48 hours |
| Beta-(4-bromo-phenoxy)-ethyl bromide (melting at 55°-56° C.) | 28.9 | 5.8 | 95 | 27 | 99.3 | 51.7 |
| Gamma-(4-bromo-phenoxy)-propyl bromide (melting at 45°-46° C.) | 45.6 | 14.5 | 95 | 27 | 97.2 | 52.3 |
| Beta-(4-bromo-phenoxy)-ethyl chloride (melting at 58°-58.5° C.) | 34.0 | 8.0 | 95 | 27 | 98.4 | 41.1 |
| Gamma-(4-bromo-phenoxy)-propyl chloride (melting at 44°-45° C.) | 65.4 | 8.0 | 95 | 27 | 98.4 | 40.0 |
| Gamma-(2-chloro-4-cyclohexyl-phenoxy)-propyl chloride (boiling at 165°-168° C. at 2 millimeters pressure and having a specific gravity of 1.158 at 20°/4° C.) | 45.5 | 5.1 | 98.6 | 35.9 | 99.1 | 58.3 |
| Beta-(2-chloro-4-tertiarybutyl-phenoxy)-ethyl chloride (boiling at 150°-151° C. at 6 millimeters pressure and having a specific gravity of 1.150 at 20°/4° C. | 71.6 | 9.7 | 98.6 | 35.9 | 97.7 | 60.3 |
| Beta-phenoxy-ethyl chloride (boiling at 105°-107° C. at 10 millimeters pressure and having a specific gravity of 1.153 at 20°/4° C.) | 40.8 | 2.6 | 98.6 | 35.9 | 100 | 44.3 |
| Beta-(2,4,6-trichloro-phenoxy)-ethyl chloride (melting at 31° C.) | 61.6 | 6.0 | 98.6 | 35.9 | 99.5 | 47.2 |
| Gamma-(4-tertiarybutyl-phenoxy)-isobutyl chloride (boiling at 110°-112° C. at 2 millimeters pressure and having a specific gravity of 1.023 at 20°/4° C.) | 61.8 | 10.7 | 98.6 | 35.9 | 99.2 | 54.6 |

In each of the determinations as set forth above, the pyrethrin solution alone was found to give a kill on flies much less than that required for a commercial insecticidal product. Also each of the aromaticoxy-alkyl halides alone was unsatisfactory. The compositions embodying the combination of toxicant materials, however, gave a control of flies falling within the range recommended for household insecticide materials, such degree of control being greater than additive with respect to the controls obtained with the individual components of the mixtures.

Example II

An insecticidal concentrate embodying the mixed toxicants with which the present invention is concerned is prepared by intimately mixing together 1.5 parts by weight of derris resins, 0.3 part of pyrethrin, 20 parts of gamma-(4-bromo-phenoxy)-propyl bromide, 3.0 parts of sodium lauryl sulfate, and 75.2 parts of red talc. The resulting dust composition is adapted to be applied in aqueous dispersion for the control of such agricultural pests as aphis, thrips, and spiders at the rate of 10-20 pounds per 100 gallons of spray composition.

Example III

A dust composition comprising the new toxicant mixture and adapted to be employed for the control of such agricultural pests as pea aphis has the following composition:

Parts by weight
Gamma-(4-tertiarybutyl-phenoxy)-isobutyl chloride _____ 1.5
Derris resins _____ 0.5
Walnut shell flour _____ 98.0

Among other compounds which may be compounded with pyrethrin- and/or rotenone-containing plant extracts and employed in standard type insecticidal compositions are beta-(4-chloro-butyl bromide, beta-(4-benzyl-phenoxy)-n-amyl chloride, omega-phenoxy-n-octyl chloride, etc. etc. The new toxicant mixtures with which the present invention is concerned may be used also as toxicants in emulsions and in combination with soap or other wetting, emulsifying, or detergent agents. Various perfumes or coloring agents may be employed therewith if desired. Besides petroleum distillates, such organic solvents as benzene, ethylene chloride, hydrogenated naphthalene, butyl alcohol, ketones, etc. may be employed as carriers for the toxicant mixtures. The phrase "non-corrosive organic solvent" as employed in certain of the following claims refers to any organic solvent material unreactive with and capable of dissolving the toxicants described and non-injurious to the skin and general health of humans.

Common dust carriers which may be employed in combination with the toxicant mixtures are diatomaceous earth, volcanic ash, bentonite, redwood flour, kieselguhr, white talc, and the like.

We claim:

1. An insecticidal composition comprising as an active toxicant a mixture of a material of the class consisting of rotenone- and pyrethrin-containing plant extracts with a compound having the formula

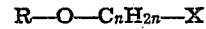

R—O—C$_n$H$_{2n}$—X wherein R represents an aromatic radical, X represents a member of the group consisting of chlorine and bromine, and n is an integer from 2 to 8, inclusive.

2. An insecticidal composition comprising a mixture of a material of the class consisting of rotenone- and pyrethrin-containing plant extracts with a compound having the formula

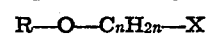

R—O—C$_n$H$_{2n}$—X where R represents an aromatic radical, X represents a member of the group consisting of chlorine and bromine, and $n$ is an integer from 2 to 8, inclusive, and wherein the synthetic ether compound is present in the amount of at least 0.5 gram per 100 grams of composition.

3. An insecticidal composition comprising a mixture of pyrethrins and a compound having the formula $$R\text{—}O\text{—}C_nH_{2n}\text{—}X$$

wherein $R$ represents an aromatic radical, $X$ represents a member of the group consisting of chlorine and bromine, and $n$ is an integer from 2 to 8, inclusive.

4. An insecticidal composition comprising as an active toxicant a mixture of a material of the class consisting of rotenone- and pyrethrin-containing plant extracts with a compound having the formula $$R\text{—}O\text{—}C_nH_{2n}\text{—}X$$

wherein $R$ represents an aromatic radical of the benzene series, $X$ represents a member of the group consisting of chlorine and bromine, and $n$ is an integer from 2 to 4, inclusive.

5. An insecticidal composition comprising a mixture of a material of the class consisting of rotenone- and pyrethrin-containing plant extracts with a compound having the formula $$R\text{—}O\text{—}C_nH_{2n}\text{—}X$$

wherein $R$ represents an aromatic radical of the benzene series, $X$ represents a member of the group consisting of chlorine and bromine, and $n$ is an integer from 2 to 4, inclusive, and wherein the synthetic ether compound is present in the amount of at least 0.5 gram per 100 grams of composition.

6. An insecticidal spray comprising a non-corrosive organic solvent and having dissolved therein a mixture of a pyrethrin-containing plant extract with a compound having the formula $$R\text{—}O\text{—}C_nH_{2n}\text{—}X$$

wherein $R$ represents an aromatic radical, $X$ represents a member of the group consisting of chlorine and bromine, and $n$ is an integer from 2 to 8, inclusive.

7. An insecticidal composition comprising as an active toxicant a mixture of a material of the class consisting of rotenone- and pyrethrin-containing plant extracts with a compound having the formula $$R\text{—}O\text{—}C_nH_{2n}\text{—}Cl$$

wherein $R$ represents an aromatic radical, and $n$ is an integer from 2 to 8, inclusive.

8. An insecticidal composition comprising as an active toxicant a mixture of a material of the class consisting of rotenone- and pyrethrin-containing plant extracts with a compound having the formula $$R\text{—}O\text{—}C_nH_{2n}\text{—}Br$$

wherein $R$ represents an aromatic radical, and $n$ is an integer from 2 to 8, inclusive.

9. An insecticidal composition comprising as an active toxicant a mixture of a material of the class consisting of rotenone- and pyrethrin-containing plant extracts with a compound having the formula $$R\text{—}O\text{—}C_2H_4\text{—}X$$

wherein $R$ represents an aromatic radical of the benzene series, and $X$ represents a member of the group consisting of chlorine and bromine.

GERALD H. COLEMAN.
FRED W. FLETCHER.